United States Patent
Pedersen et al.

[15] 3,678,772
[45] July 25, 1972

[54] REVERSE DRIVE FOR A FORAGE HARVESTER CUTTING REEL

[72] Inventors: Poul K. Pedersen, Blue Ball; Robert A. Wagstaff; Thomas W. Waldrop, both of New Holland, all of Pa.

[73] Assignee: Sperry Rand Corporation, New Holland, Pa.

[22] Filed: April 29, 1971

[21] Appl. No.: 138,510

[52] U.S. Cl. ................................................. 74/220, 56/250
[51] Int. Cl. ........................................ F16h 9/04, A01d 75/08
[58] Field of Search ........................... 74/220; 56/250; 51/36

[56] References Cited

UNITED STATES PATENTS

| | | | |
|---|---|---|---|
| 2,718,154 | 9/1955 | Mathson | 74/220 |
| 2,880,814 | 4/1959 | Sensenig et al. | 74/220 X |
| 2,930,246 | 3/1960 | Johnson et al. | 74/220 |
| 3,052,311 | 9/1962 | Leedom | 74/220 X |
| 3,612,203 | 10/1971 | Kuecker | 74/220 |

*Primary Examiner*—Leonard H. Gerin
*Attorney*—John C. Thompson, George C. Bower, Joseph A. Brown, Larry L. Coats and James J. Kennedy

[57] ABSTRACT

The cutting reel of a forage harvester is driven in the forward chopping direction by the main input drive through a detachable coupling and in the reverse blade sharpening direction by the main input drive by a reversing drive bridging the detached coupling.

5 Claims, 10 Drawing Figures

Patented July 25, 1972
3,678,772
3 Sheets-Sheet 1
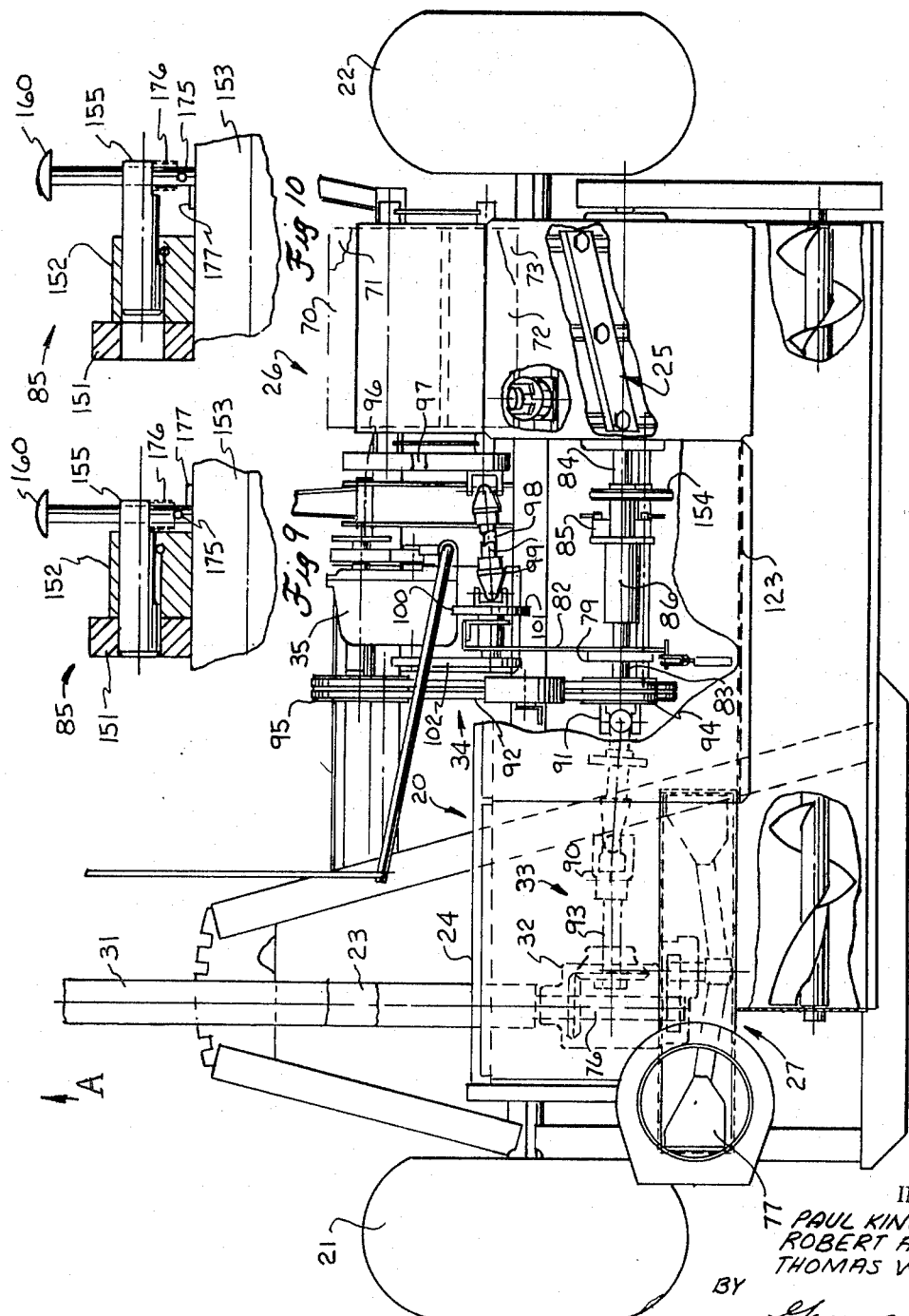
INVENTOR.
PAUL KINGO PEDERSON
ROBERT A. WAGSTAFF
THOMAS W. WALDROP
BY
George C. Bower
ATTORNEY

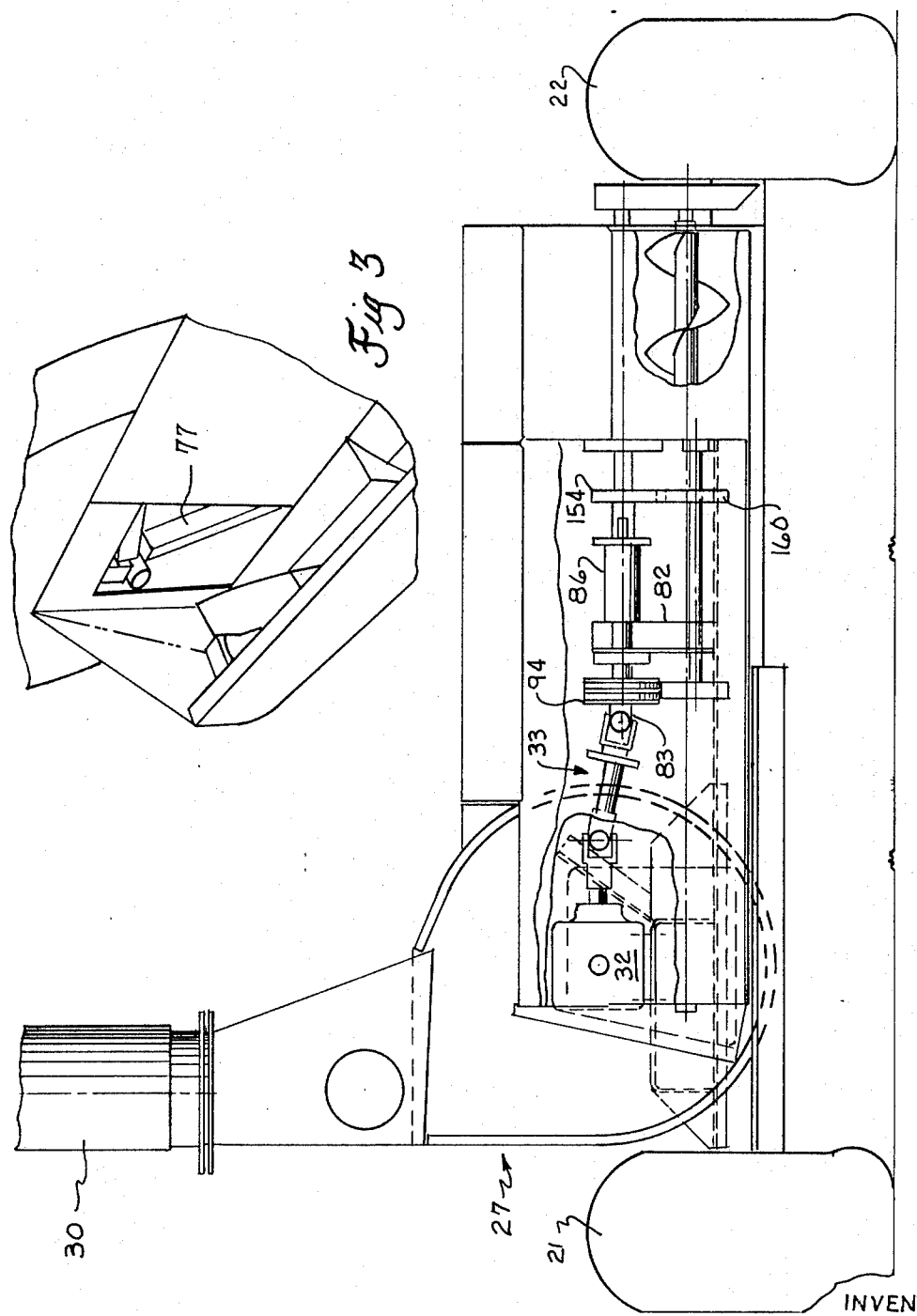

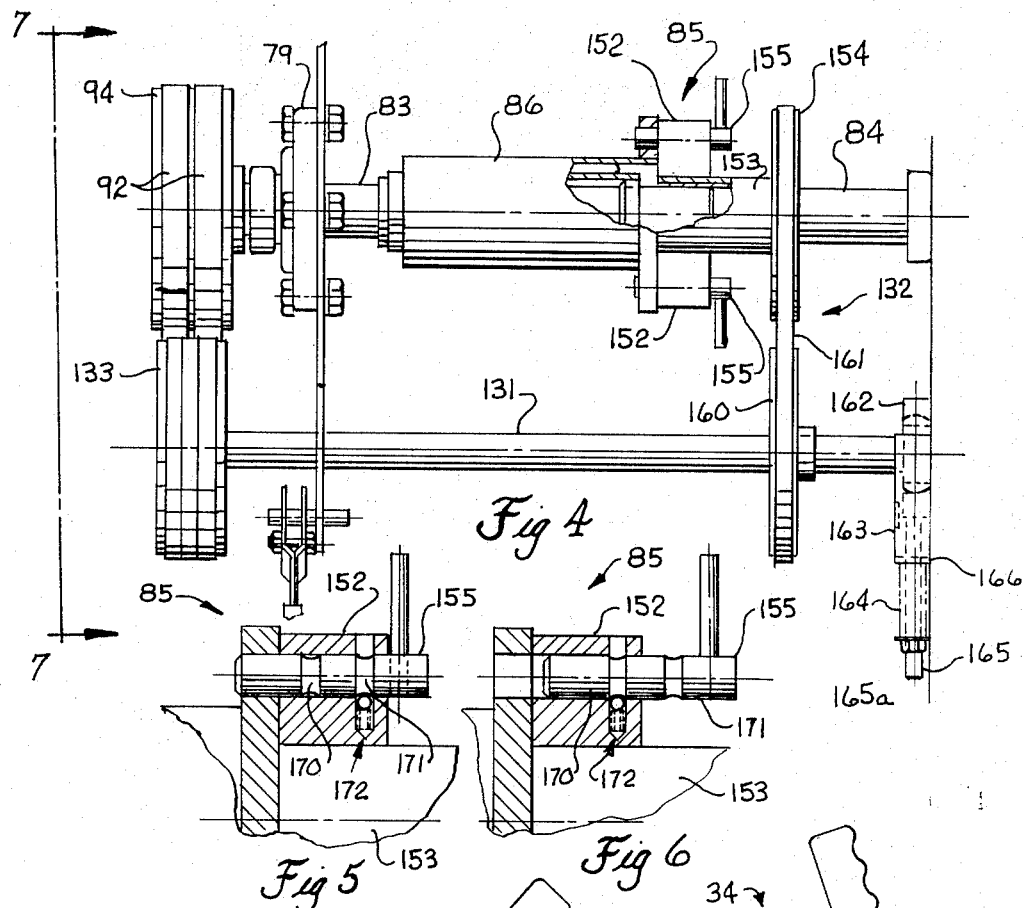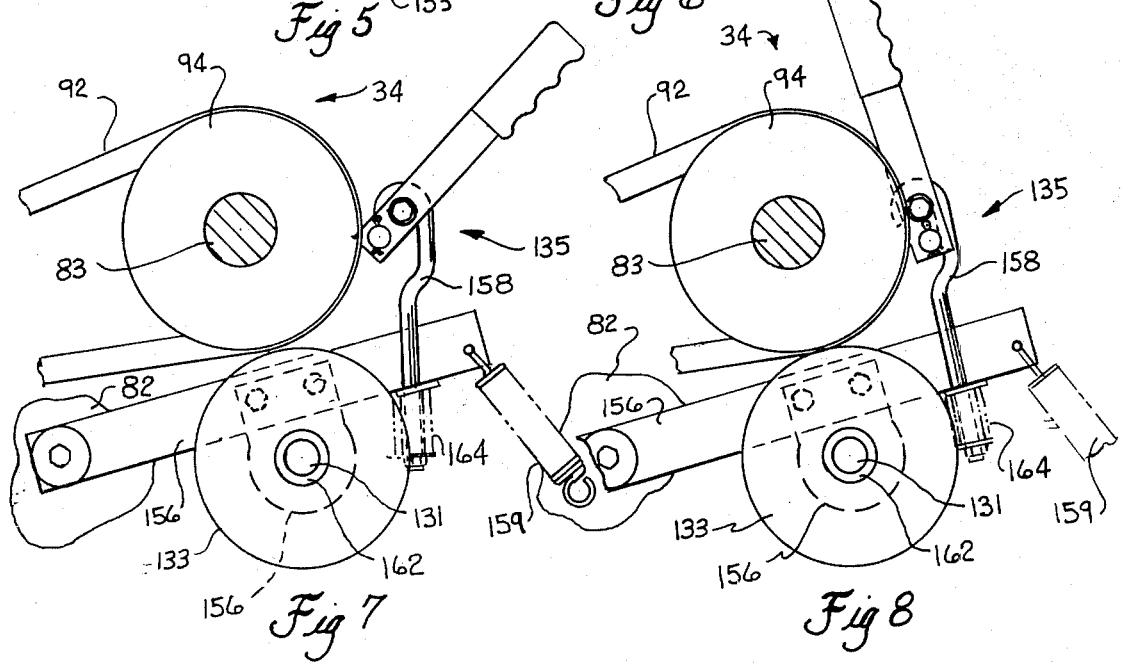

3,678,772

REVERSE DRIVE FOR A FORAGE HARVESTER CUTTING REEL

BACKGROUND OF THE INVENTION

This invention relates to forage harvester drives and is directed particularly to the drive rotating the cutting reel in reverse for sharpening the cutting blades.

The cutting blades of the reel on a forage harvester must be kept sharp and in proper cutting relation with the shear bar to comminute the harvested crop into small silage pieces. The blades therefore have to be periodically resharpened and reset in relation to the shear bar. Heretofore the blades have been removed and sharpened separately from the forage harvester or an abrasive stone is mounted on the cutterhead and passed back and forth along the edge of a stationary blade. In each instance the blade is individually sharpened and reset in relation to the shear bar.

Presently it has been found advantageous to rotate the reel opposite to the direction of cutting and pass the abrasive stone back and forth sharpening all the blades as the reel rotates. This provides a rapid and still accurate method of resharpening the blades on the reel with each cutting edge reformed to subscribe the same arc.

OBJECT AND SUMMARY OF THE INVENTION

An object of the invention is to provide a reversing drive connected directly to the main input drive of the forage harvester.

Another object of the invention is to provide reverse driving of the cutting reel of a forage harvester without driving through any of the components of the forage harvester.

Another object of the invention is to provide an inexpensive directly connected reversing drive for a forage harvester.

Another object of the invention is to provide a reversing drive for the cutting reel of a forage harvester that is readily accessible.

In summary this invention comprises a rotatably mounted shaft parallel to the main cutting reel drive and bridging a detachable coupling therein, a belt and pulley drive on one side of the coupling drivingly connecting said main drive and said rotatable shaft, a drive transmission means on the other side movable in and out of engagement with the main drive for driving the cutting reel in reverse.

These and other objects and advantages of this invention will be apparent from the following description and claims taken in connection with the accompanying drawings which illustrate the various features of this invention.

BRIEF DESCRIPTION OF THE DRAWINGS

FIG. 1 illustrates a top plan view of the forage harvester.

FIG. 2 illustrates a rear view of the forage harvester with a portion of the auger feed mechanism and the blower removed to illustrate the gearbox and drive train.

FIG. 3 is a fragmentary perspective of the blade on the end of the feed auger and the inlet opening of the forage blower.

FIG. 4 is a rear view of the reversing drive and a portion of the drive train.

FIG. 5 illustrates the coupled relation of the detachable coupling.

FIG. 6 illustrates the detachable relation of the coupling on the drive train.

FIG. 7 is an end view of the non-driving relation of the reverse drive and main drive.

FIG. 8 is an end view of the driving relation of the reverse drive and main drive.

FIG. 9 is an axial view of another embodiment of the main drive detachable coupling in coupled relation.

FIG. 10 is an axial view of another embodiment of the main drive detachable coupling in an uncoupled relation.

DETAILED DESCRIPTION OF THE INVENTION

The forage harvester has a generally transverse main frame 20 with a transversely extending square tubular beam 24 supported on ground engaging wheels 21,22 at the respective ends of the beam. The harvester is drawn in direction A by a square tubular hitch 23 pivotally connected to the left end portion of the beam. On the outboard end is a feed roll mechanism 26 receiving harvested crop material from a pickup or row attachment and metering it to a cutterhead 25. The cutterhead has a rotatable cutting reel with blades which chop the crop in cooperation with a shear bar (not shown) in a well-known manner. The small pieces form a silage which is conveyed from the cutterhead 25 to the forage blower 27 at the inboard end by a transverse feed along the rear of the harvester. The blower discharges the silage into a trailing wagon (not shown) through a rearwardly extending adjustable spout 30 (partially shown).

Power is delivered to the various operating mechanisms by the main drive shaft 31 extending along and above the hitch from a tractor power take-off (not shown). The fore-and-aft main drive shaft 31 is connected to the main input gearbox 32 mounted on the left end of the forage harvester. The cutterhead 25 is connected to the main gearbox 32 by a drive train 33. The feed roll mechanism is driven from the drive train through the belt and pulley drive 34 reduction gearbox 35, chain and sprocket drive 102, gears 100,101, connecting drives 98,99 to the chain sprocket drives 96,97 connected to the upper rolls 70,72 and lower rolls 71,73 respectively. The fan 77 of the blower 27 is mounted and driven by the main shaft 76 of the gearbox 32.

The drive train has a short intermediate drive shaft 83 rotatably mounted in the bearing 79 supported by the vertical fore-and-aft plate 82. The left end of the shaft is connected to the gearbox 32 by the connecting shaft 93 and universal joints 90,91. On the other side of the plate, the pulley 94 of the belt and pulley drive 34 is mounted and keyed to the shaft 83. The pulley 94 is connected by the belts 92 to the driven pulley 95. The short shaft 83 is connected to the reel shaft 84 by a resilient coupling 86 and detachable coupling 85.

The coupling 85 is disconnected from the drive train 33 before the reversing drive rotates the cutting reel. After the coupling is disconnected, the roller 133 is moved into engagement with the pulley 94.

The roller 133 is keyed to the shaft 131 and moved in and out of engagement with the pulley 94 of the belt and pulley drive 34 by the adjustable support 135. The adjustable support comprises a handle a bearing support lever 156 and link 158. The handle is pivotally attached to the plate 82 forwardly of the pulley 94 and about the same level as the shaft 83. The bearing supporting lever 156 carries the shaft 131 and the link 158 connects the lever 156 and shaft 131 to move the lever in response to actuation of the handle. The lever 156 is also pivotally attached to the plate 82 but forwardly of the pulley 94 and extends rearwardly underneath and past the pulley 94. A bearing 162 is intermediately mounted on the lever and rotatably supports the shaft 131. The roller 133, therefore, is underneath the pulley 94.

The handle 130 extends rearwardly at an upward angle. The link 158 extends downwardly past the lever and is connected to the lower side of the lever by a helical spring 164—so that the roller is resiliently held against the driving pulley 94. The link 158 is pivotally connected to the handle 130 by a hooked end on the link and a pin on the handle. The linkages and connections are so arranged that when the handle 130 is moved forward in the direction A, the hooked portion of the link passes over dead center to lock the roller in driving relation against the drive sheave 94 of the belt and pulley drive 34.

A helical spring 159 is attached between the rear end of the lever 156 and the transverse wall 123. This spring provides a positive disengaging force on release of handle.

Two embodiments of the detachable coupling 85 are described. The embodiment on the forage harvester of FIGS.

1 and 2 are shown in detail in FIGS. 5 and 6 and an alternate and preferred embodiment is shown in FIGS. 9 and 10. The detachable coupling 85 of FIGS. 5 and 6 comprises a flange 151 on the outer sleeve of the resilient coupling and two blocks 152 diametrically secured to the cylindrical hub 153 of the sheave 154 of the belt and pulley drive. Two pins 155 are slideably mounted in the respective blocks 152. The pins 155 have longitudinally spaced grooves 170,171 engaged by a ball and spring detent means 172 to hold the pins in either coupled or decoupled positions. In the coupled positions the drive train 33 rotates the reel in the forward chopping direction. In the decoupled position, the reverse drive rotates the reel in the reverse blade sharpening direction.

In the other embodiment the pins 155 are slideably mounted in the block members 152 as in the previously described embodiment. The pins 155 are, however, held in the respective coupled and decoupled positions by bolts 160 extending normal to the hub 153 and slideably mounted in bores in the actuated ends of the pins. A retention member 175 extends through the bolt between the respective pin 155 and hub 153 and springs 176 between the respective pins and retention members 175 urge the bolts towards and in engagement with the hub 153. Stops 177 on the hub are engaged by the tips of the bolts to hold the pins in coupled relation with the flange 151 (FIG. 9) and in the decoupled relation (FIG. 10). The bolts are disengaged by lifting the bolts outwardly. Thus the drive train 33 may be readily and easily connected to or disconnected from the cutting reel shaft.

The roller turns the shaft 131. The belt and pulley drive 132 has the drive sheave 160 keyed to the shaft 131 and the sheave 154 drivingly coupled to the decoupled reel shaft 84 for reverse rotation through the belt 161. This belt is always in driving relation with the sheaves and when the reel shaft is turning in the cutting direction the belt turns the idle shaft 131 in the opposite direction to the reverse drive.

The shaft 131 is mounted to float or tilt in response to the roller 133 being engaged or disengaged. This floating action occurs about the continuous coupled belt and pulley drive 132. The shaft 131 is resiliently supported by the helical spring 159 at the left end of the shaft and by the resiliently and slideably support bearing block 162 at the right end of the shaft. The block 162 slides in the parallel guide legs 163 of the U-shaped bracket. The cross strap of bracket extends between the bottom ends of the legs and has an opening to pass the shaft 165 fastened to the bearing block. A helical spring 164 is positioned between the strap 166 and a nut 165a to press the bearing block downwardly or away from the shaft 131 so that the shaft and sheave 160 are pulled against the belt 161. The helical spring 159 connected to the lever 156 pulls the shaft 131 and sheave 160 downwardly against the belt 161.

When the roller 133 is forced into the engaged position the left end of the shaft 131 is moved upwardly and the right end is moved downwardly. The bearing block slides downwardly. When the roller 133 is disengaged the left end of shaft 131 moves downwardly and the right end moves upwardly against the spring 164. The shaft 131, therefore, rocks or floats about belt 161 as the reversing drive is shifted from the operative to the inoperative condition or from the inoperative to the operative condition.

While this invention has been described in connection with a single embodiment, it will be understood that this embodiment is capable of modification and that the foregoing description is intended to cover any variations, uses or adaptations following, in general, the principles of the invention and including such departures from the present disclosures as come within known or customary practice in the art to which the invention pertains, and as fall within the scope of the invention or the limits of the claims.

Having thus described our invention, what we claim is:

1. Drive means for the reel of a cutterhead fixedly mounted on a reel shaft comprising:
   a main drive connected to said reel shaft and having a disengageable coupling,
   a reversing drive having a shaft parallel to said main shaft and having first means for coupling said shaft to said main drive and second means longitudinally spaced from said first means for coupling said shaft to said reel shaft,
   one of said means being in continuous driving relation
   adjusting means rotatably supporting said shaft and moving the other of said means into and out of power transfer relation to drive said reel in a direction opposite to said main drive.

2. Drive means as set forth in claim 1 wherein there is provided means for resiliently mounting said reversing drive shaft on the opposite side of said continuous coupled means from said adjusting means for maintaining said continuous coupled means in coupled relation under all power transfer relations.

3. Drive means as set forth in claim 1 wherein said continuously coupled means is on the cutting reel side of said detachable coupling.

4. Drive means as set forth in claim 1 wherein said adjusting means is a pivotally mounted lever rotatably supporting said reverse drive shaft, a handle above said lever and a link pivotally connected to said handle and resiliently connected to said lever on the opposite side of said reverse drive shaft from the pivotal mounting of said lever to pass through dead center with said handle to hold said other coupling means in power transfer relation.

5. Drive means as set forth in claim 1 wherein said main drive has a pulley of a belt and pulley drive and said other coupling means includes a roller engaging said pulley when moved into a power transfer relation.

* * * * *